United States Patent [19]

Brandt et al.

[11] Patent Number: 4,575,203
[45] Date of Patent: Mar. 11, 1986

[54] MIRROR VIBRATION ABSORBER

[75] Inventors: Herbert E. Brandt; Thomas C. Tecco, both of Fort Wayne, Ind.

[73] Assignee: International Harvester Company, Chicago, Ill.

[21] Appl. No.: 637,674

[22] Filed: Aug. 3, 1984

[51] Int. Cl.⁴ .......................... G02B 5/08; B60R 1/02; F16F 15/28
[52] U.S. Cl. ................................... 350/631; 248/476; 267/140.2; 188/378; 188/380
[58] Field of Search ............... 350/632, 631, 639, 600, 350/636, 633, 634; 248/475.1, 476, 479; 267/140.2; 188/378, 380

[56] References Cited

U.S. PATENT DOCUMENTS 4,277,140 7/1981 Manzoni .............................. 350/632
4,456,333 6/1984 Hewitt .................................. 350/637

FOREIGN PATENT DOCUMENTS 142738 12/1978 Japan ................................... 350/631
191141 11/1982 Japan ................................... 350/637

Primary Examiner—Jon W. Henry
Attorney, Agent, or Firm—F. David AuBuchon; Dennis K. Sullivan

[57] ABSTRACT

A mirror vibration absorber for mirror assemblies mounted on motor vehicles comprises a ballast absorbing the vibration of the mirror assembly and disposed either inside or outside thereof. The position and weight of the ballast can be adjusted to the specific vibration frequency of the mirror assembly. The adjustment of the ballast position is made either by moving the adjustment of rods secured to the ballast relative to the mirror assembly or by moving the ballast relative to the adjustment rod. The ballast absorbs the mirror vibration and thereby reduces the need for reenforcing mounting hardware and braces.

10 Claims, 4 Drawing Figures

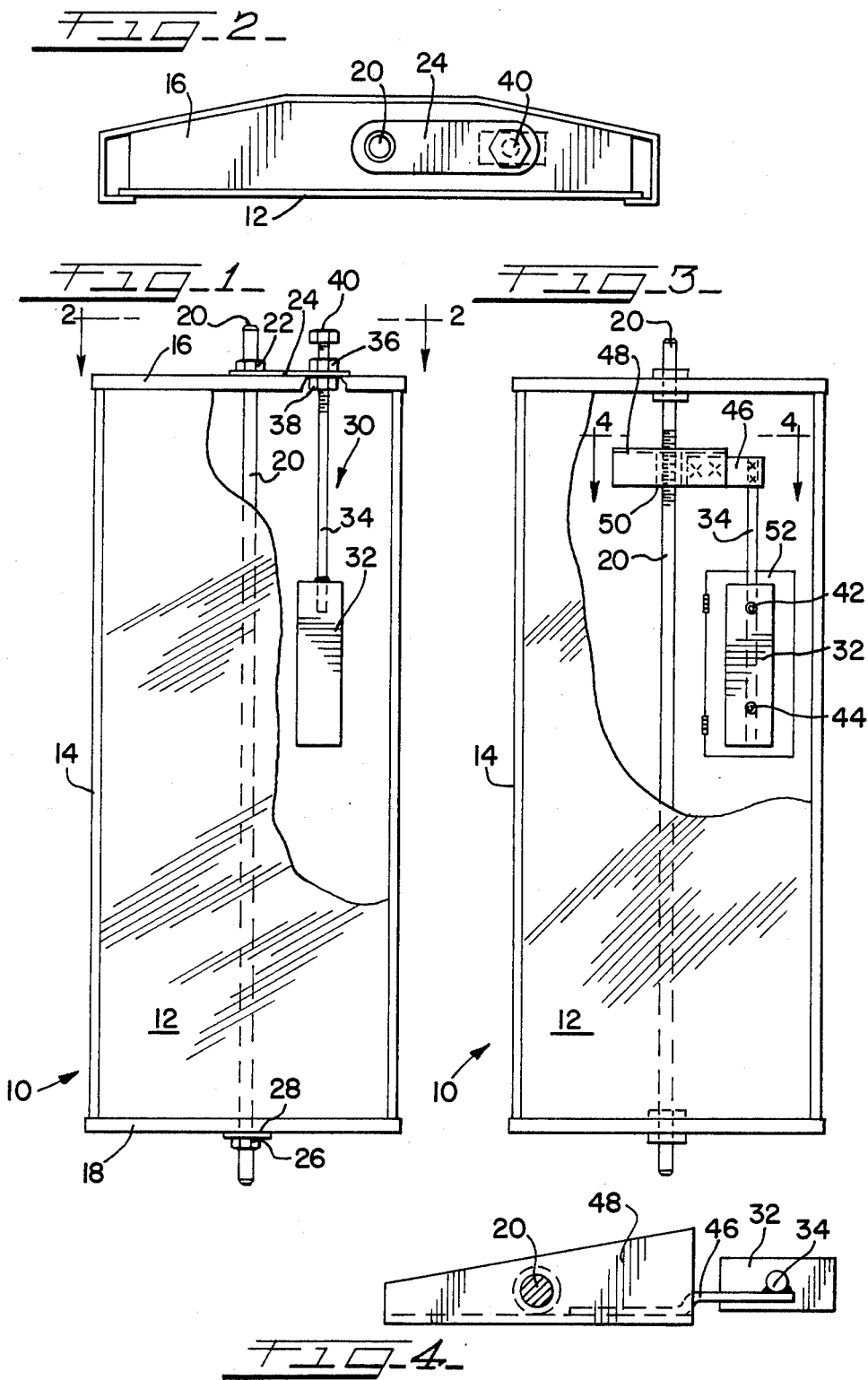

:::page
MIRROR VIBRATION ABSORBER

BACKGROUND OF THE INVENTION

This invention pertains to anti-vibration devices and more particularly to a vehicle outside mirror vibration absorber.

Vibration of rear view mirrors presents a problem of clear visibility of the space and traffic behind the motor vehicle. The poor visibility endangers the safety of the vehicle operation. The mirror vibration is presently controlled with expensive braces and other mounting hardware.

The subject invention eliminates the necessity of mounting expensive hardware and effectively reduces the mirror vibration by utilizing a simple structure described in detail hereinbelow.

SUMMARY OF THE INVENTION

According to the present invention, a vehicle outside mirror assembly is connected with a vibration absorber assembly. The vibration absorber assembly comprises a ballast spaced from and adjustably connected with the mirror assembly. The ballast location and weight are selected depending on the mirror vibration frequency

BRIEF DESCRIPTION OF THE DRAWINGS

FIG. 1 is a partially cross-sectional side view of the mirror assembly with a vibration absorber;

FIG. 2 is a top view of the vibration absorber device and mirror assembly taken substantially along the lines 1—1 in FIG. 1;

FIG. 3 is a partially cross-sectional view of the mirror assembly with a vibration absorber being located inside of the mirror assembly; and FIG. 4 is a cross-sectional view taken substantially along the lines 4—4 in FIG. 3.

DESCRIPTION OF THE PREFERRED EMBODIMENT

The invention may be carried into practice in a number of ways but two specific embodiments will be described by way of example only.

Referring now to the drawings wherein reference characters designate like or corresponding parts throughout the several views, there is shown in FIG. 1 a mirror assembly 10. The mirror assembly 10 includes a mirror 12 enclosed by side walls 14, top plate 16 and bottom plate 18. A support rod 20 extends through the mirror assembly 10 and protrudes through the top and bottom plates 16 and 18 connecting the mirror assembly to the body of a motor vehicle. (not shown) The support rod 20 is secured to the top plate 16 by a nut 22 and vibration absorber mounting plate 24. The rod 20 is secured to the bottom plate 18 by a jam nut 26 and a washer 28. The vibration absorber 30 mounted inside the mirror assembly 10 comprises a metal ballast 32 secured to the mounting rod 34. The rod 34 is secured to the mounting plate 24 by a jam nut 36 pressing the mounting plate 24 to a nut 38 welded to the opposite side of the mounting plate 24. The adjustment rod 34 is controlled by a cap 40 rotating the aborber assembly 30 threadably engageable with the jam nut 36. In the above described embodiment the mirror vibration absorber 30 is placed into the predetermined position corresponding to an ihherent mirror assembly vibration frequency by moving the ballast 32. The ballast 32 reciprocal movement along the vertical axis is necessitated by rotation of the cap 40.

The vibration absorber in its second embodiment shown in FIG. 3 is designed for internal adjustment and disposed within the mirror assembly.

The ballast 32 is adjustably secured to the adjustment rod 34 by set screws 42 and 44. The adjustment rod 44 rigidly secured or welded to the bracket 46 which in turn is welded to the mount block 48. The block 48 is welded or fastened with nuts to the rod 20. The vibration absorber adjustment can be made by moving the ballast 32 up or down on the rod 34 (using set screws 42 and 44) through the access door 52 placed in the side wall 14.

The metal ballast can be adjustable and nonadjustable. The adjustable position of the ballast corresponds to the mirror assembly vibration frequency by virtue of moving the adjustment rod in both embodiments. Thereby the ballast is tuned to a particular mirror assembly. In the nonadjustable mode the ballast position is empirically or analytically selected.

The advantages of the subject invention include a simplicity of the structure eliminating the expensive mounting braces and hardware, while reducing the mirror vibration. The subject invention does not require expensive tools, materials, or labor for installation and service thereof. The effectiveness and simplicity of the structure contributes to the overall safety of the motor vehicle operation.

While two embodiments of the invention have been illustrated and described herein, various changes and modifications may be made therein without departing from the spirit of the invention as defined by the scope of the appended claims.

What is claimed is:

1. A motor vehicle mirror assembly comprising:
   a mirror frame having side walls defining an internal cavity;
   a vertical support rod attached to said frame for connecting said mirror assembly to an associated motor vehicle body;
   a mounting means connected to said support rod;
   and a vibration absorber connected to said mounting means, said absorber comprising an adjustment rod with a ballast secured thereto free from contact with said side walls said ballast position being adjustable relative to said mounting means.

2. The invention according to claim 1, and said mounting means comprising a mounting plate with nut means threadably engageable with said adjustment rod.

3. The invention according to claim 1, and said ballast being located within the mirror cavity.

4. The invention according to claim 1, and the ballast means being adjustable relative to said mounting means by virtue of the movement of said ballast relative to said adjustment rod.

5. The invention according to claim 1, and said mounting means comprising a mounting block threadably engageable with said support rod.

6. The invention according to claim 6, and said mounting block being rigidly secured to said adjustment rod.

7. A mirror vibration absorber mounted on a motor vehicle mirror assembly having walls defining an internal cavity and comprising:
   a support rod for connecting said mirror assembly to an associated motor vehicle body;

a mounting means connected between said support rod and said vibration absorber, said absorber comprising a ballast within said cavity and free from contact with said mirror assembly walls adjustably secured to an adjustment rod attached to said mounting means.

8. The invention according to claim 7, and mounting means comprising a mount block threadably engageable with said support rod.

9. The invention according to claim 7, and said mirror assembly having an access door facilitating an adjustment of said ballast.

10. A motor vehicle mirror assembly comprising:

a mirror frame having vertical side walls for supporting a mirror;
a vertical support rod attached to said mirror frame for connecting said mirror assembly to an associated vehicle body;
a mounting means attached to said support rod and extending radially therefrom to a distal end;
a second vertical rod attached to said distal end of said mounting means and extending therefrom parallel to said support rod; and
a ballast weight attached to said second rod, said ballast weight being free from contact with said mirror frame.

* * * * *